(12) United States Patent
Wajs

(10) Patent No.: US 10,938,808 B2
(45) Date of Patent: Mar. 2, 2021

(54) ACCOUNT ACCESS

(71) Applicant: Irdeto B.V., Hoofddorp (NL)

(72) Inventor: Andrew Augustine Wajs, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 65 days.

(21) Appl. No.: 16/088,037

(22) PCT Filed: Apr. 13, 2017

(86) PCT No.: PCT/EP2017/058958
§ 371 (c)(1),
(2) Date: Sep. 24, 2018

(87) PCT Pub. No.: WO2017/178599
PCT Pub. Date: Oct. 19, 2017

(65) Prior Publication Data
US 2020/0177584 A1 Jun. 4, 2020

(30) Foreign Application Priority Data
Apr. 15, 2016 (GB) ...................................... 1606665

(51) Int. Cl.
*H04L 29/06* (2006.01)
*H04L 9/32* (2006.01)

(52) U.S. Cl.
CPC ........ *H04L 63/0861* (2013.01); *H04L 9/3231* (2013.01)

(58) Field of Classification Search
None
See application file for complete search history.

(56) References Cited

U.S. PATENT DOCUMENTS 6,167,517 A 12/2000 Gilchrist et al.
10,373,148 B1 * 8/2019 Dixon ................ G06Q 20/3223
(Continued)

FOREIGN PATENT DOCUMENTS

EP 1777640 A1 4/2007

OTHER PUBLICATIONS

International Searching Authority, International Search Report and Written Opinion for Application No. PCT/EP2017/058958 dated Jul. 20, 2017.

(Continued)

*Primary Examiner* — Benjamin E Lanier
(74) *Attorney, Agent, or Firm* — Rimon PC; Marc Kaufman

(57) ABSTRACT

A method for facilitating a user to subsequently access, via an application executed by a user device of the user, an account for one or more services provided by a service provider, wherein said access is controlled based on biometric verification of the user performed, at least in part, at the user device, wherein the method comprises: obtaining reference data from a storage device, wherein the storage device stores biometric data for the user suitable for use in the biometric verification of the user, and wherein the reference data is suitable for use in one or both of: (a) subsequent access of the biometric data from the storage device and (b) authentication of the biometric data; and providing the reference data to an access system used by the service provider so that the access system can associate the reference data with an identifier associated with the user.

17 Claims, 5 Drawing Sheets

(56) References Cited

U.S. PATENT DOCUMENTS

| | | | |
|---|---|---|---|
| 2003/0070079 A1* | 4/2003 | Cromer | G06F 21/575 |
| | | | 713/186 |
| 2004/0117636 A1 | 6/2004 | Cheng | |
| 2007/0061590 A1 | 3/2007 | Boye et al. | |
| 2007/0198435 A1 | 8/2007 | Siegal et al. | |
| 2007/0250718 A1* | 10/2007 | Lee | H04L 9/0662 |
| | | | 713/186 |
| 2012/0240204 A1* | 9/2012 | Bhatnagar | H04L 63/0428 |
| | | | 726/5 |
| 2013/0174243 A1* | 7/2013 | Inatomi | H04L 63/0861 |
| | | | 726/7 |
| 2013/0226813 A1 | 8/2013 | Voltz | |
| 2013/0262873 A1* | 10/2013 | Read | H04W 12/06 |
| | | | 713/186 |
| 2014/0250517 A1* | 9/2014 | Kim | G06K 9/00617 |
| | | | 726/7 |
| 2014/0331294 A1* | 11/2014 | Ramallo | G06F 21/35 |
| | | | 726/5 |
| 2015/0082024 A1 | 3/2015 | Smith | |
| 2015/0242607 A1* | 8/2015 | Morris | H04L 63/0407 |
| | | | 713/186 |
| 2016/0302071 A1* | 10/2016 | Jones | H04W 8/183 |
| 2017/0185761 A1* | 6/2017 | Stanwood | H04L 9/0863 |
| 2018/0268414 A1* | 9/2018 | Chung | G06Q 20/40145 |

OTHER PUBLICATIONS

UK Intellectual Property Office, Search Report for Application No. GB1606665.6 dated Sep. 15, 2016.

Wikipedia, entry for Biometric Passport, last updated Apr. 9, 2016, retrieved on May 15, 2019, available at: https://en.wikipedia.org/w/index.php?title=Biometric_passport&oldid=714357615.

European Patent Office, Communication Pursuant to Article 94(3) EPC, Examination Report for European Application No. 17717704.5 dated Jul. 23, 2019.

European Patent Office, Communication Pursuant to Article 94(3) EPC, Examination Report for European Application No. 17717704.5 dated Jun. 10, 2020.

* cited by examiner

ACCOUNT ACCESS

FIELD OF THE INVENTION

The present invention relates to methods for facilitating a user to access an account, methods for a user to access an account, methods for managing access by a user to an account, and systems and computer programs for carrying out such methods.

BACKGROUND OF THE INVENTION

Users have increasing amounts of personal data (such as images, email, documents, movies, audio, etc.) stored in the cloud. This personal data usually is stored in a secured manner and is accessed/unlocked using a username and passphrase combination. When an attacker obtains this access/unlocking information (e.g. the username and passphrase), the user's personal data is at risk. It is known, for example, for celebrities to have their personal accounts (e.g. email accounts) hacked in this manner and have some very personal information exposed.

Service providers now make extensive use of a fingerprint reader (biometric sensor) to authenticate a user prior to allowing access to personal data of the user that is stored in the cloud. Other forms of biometric authentication (e.g. based on voice or facial features/characteristics) are known.

The authentication process is shown in the FIG. 1 of the accompanying drawings. In particular, FIG. 1 shows a biometric sensor that sends a biometric data sample (e.g. a fingerprint read, a voice recording, or an image recording, etc.) to a user detection module. For a fast and reliable detection of a user, the user detection module relies on a set of parameters for efficient determination of characterizing features from the biometric data sample. The parameters are established during a learning process in which a series of biometric data samples are obtained. A parameter estimation module determines the common features from the series of biometric data samples and calculates the parameters for use by the user detection module. The sensor samples, the parameters and the user detection module preferably are implemented in a secured processor module of the device performing the biometric authentication. This protects the user's privacy as no biometric information leaves the device (e.g. a mobile telephone) implementing the biometric authentication, and this sensitive information also is protected against malware attacks. These measures help to increase consumer adoption of this technology.

The biometric sensor data serves to authenticate the user to the device, as discussed above. It is possible to configure the device to extend the fingerprint authentication for accessing cloud services. This extension of the authentication may be implemented using a cryptographic protocol that is based on keys stored in the secured processing module of the device.

The above-mentioned learning process (for parameter estimation for later use in the user detection) is dependent on the collection of sensor samples. This means that each learning process for the same person may produce a slightly different set of parameters even though each parameter set reliably detects the user from a subsequent sensor sample. In some instances the user detection process also may adapt the parameters (i.e. provide a feedback mechanism). This means that the parameters may change over time.

Electronic passports (also known as e-passports, ePassports, digital passports or biometric passports) are well-known—see, for example, https://en.wikipedia.org/wiki/Biometric_passport, the entire disclosure of which is incorporated herein by reference. Electronic passports have a smart card chip in them and use standard near field communication (NFC) technology to interface to, and communicate with, a passport reader. Other devices (such as mobile telephones) with NFC devices capable of NFC communication can also interface to, and communicate with, electronic passports. The communication with the electronic passport is protected (e.g. encrypted) using one or more keys derived from data that is optically readable (e.g. data printed on a page of the electronic passport). The idea is that no one can access this data without being shown the electronic passport first, i.e. without the electronic passport being present. For example, an electronic passport scanner/reader (or other device) may first read the passport optically, derive the key(s) for communication and use the secured data channel to request data fields from the electronic passport. These data fields are currently unencrypted and signed only whilst stored on the electronic passport—it is the use of the keys to secure the communication between the electronic passport and the reader that protects the data fields from eavesdropping.

It will be appreciated that electronic identification cards, electronic licences (such as driving licences), etc. may operate in similar ways.

Generally, electronic identification can be defined as an identification means that may include a secure device which may be embedded in a physical embodiment which includes a means to communicate with a reader through an electronic means and which may include visibly readable data (e.g. an image and/or text). Such electronic identification could, therefore, be an electronic passport, an electronic identification card, an electronic licence, or some other token, etc.

U.S. Pat. No. 7,325,141 (the entire disclosure of which is incorporated herein by reference) describes an access recovery mechanism that provides an automated solution which allows recovery of secured access. The mechanism does this by complementary encryption of the user's passphrase and responses to personal questions, the reference responses being encrypted with the passphrase and the passphrase being encrypted with the reference responses. When a user loses his passphrase, he can provide answers to the personal questions and the system can recover both the reference responses and the passphrase, so the account can be re-initialized by entering a new passphrase. The mechanism also allows "approximate matching", so biometric data can be used for identification.

SUMMARY OF THE INVENTION

One problem encountered with the above is the handling of a lost device (e.g. a lost mobile phone) or a loss of proper functioning of the device for whatever reason (e.g. due to damage to the device) or a re-initialization of the device (e.g. back to factory-settings). As the fingerprint data (or other biometric/identification data) is stored in the device itself and never leaves the device, the server for the cloud-based service has no access to the fingerprint data. Hence, if the device is lost/damaged/re-initialized/etc., then the fingerprint data is lost. The security relies on the secure chip in the device verifying the fingerprint and simply sending a signed authentication result to the server. This enables the server to know that a correct fingerprint was obtained by the device. When the device no longer is available (or can no longer carry out this user authentication), the current approach to restoration of the access to the personal data or account is based on a username and passphrase combination. It would be desirable to provide a more secure/reliable method for recovering/restoring access.

Embodiments of the invention allow a user to associate an electronic identification (an electronic passport, electronic identification card, electronic licence, or other token) with an account or user profile. In some embodiments, the user can, for purposes of normal access of an account, or configuration of an account, use such an electronic identification. The electronic identification may make use of a public key infrastructure to which the issuer of the account has no access. The user may wish to associate another form of authentication or identification to the account (e.g. in the form of a new password, a new biometric capable unit etc.).

In some embodiments (where a user can access his account via a password), then if that user's account has been hacked (e.g. the password and user id has been compromised), the user may use the electronic identification to recover access to the account (i.e. show/demonstrate to the account issuer that they are in fact who they say they are and recover the access to the account).

It would be desirable if the issuer of the account does not have access to sensitive data within the electronic identification (e.g. biometric data). For example, it would be preferable if the issuer of the account does not store or have access to personal information such as name, date, passport number, or biometric data such as the passport photograph, fingerprint or iris scan.

Preferably, then, the party issuing the account is constrained in the following ways:
(a) They do not have access to the PKI infrastructure needed to validate data from the electronic identification. In the case of electronic passports, certain public keys for the issuing country for the passport are not publicly available (and so are not available to the account issuer). These keys are, instead, issued in a very controlled fashion between nation states. This means a private or person institution cannot validate fields using the public key of the issuing party in a conventional manner (e.g. checking digital signatures using a public key).
(b) They may not be able to store personal information or biometric information in their servers for customer privacy reasons.

Some embodiments of the invention therefore provide an access method in which the user registers information that enables the restoration of credentials that reflect biometric data obtained by a mobile phone (or other device) or that are stored in an external device.

According to a first aspect of the invention, there is provided a method for facilitating a user to subsequently access, via an application executed by a user device of the user, an account for one or more services provided by a service provider, wherein said access is controlled based on biometric verification of the user performed, at least in part, at the user device, wherein the method comprises: obtaining reference data from a storage device, wherein the storage device stores biometric data for the user suitable for use in the biometric verification of the user, and wherein the reference data is suitable for use in one or both of: (a) subsequent access of the biometric data from the storage device and (b) authentication of the biometric data; and providing the reference data to an access system used by the service provider so that the access system can associate the reference data with an identifier associated with the user.

The reference data may comprise one or more of: an address for the storage device; a cryptographic hash of some or all of the biometric data stored on the storage device; a digital signature of some or all of the biometric data stored on the storage device; a public key.

According to a second aspect of the invention, there is provided a method for a user of a user device to access, via an application executed by the user device, an account for one or more services provided by a service provider, wherein said access is controlled based on biometric verification of the user performed, at least in part, at the user device, wherein the method comprises: providing an identifier associated with the user to an access system used by the service provider; receiving, from the access system, reference data associated at the access system with the identifier; using at least part of the reference data to obtain, from a storage device, first biometric data stored on the storage device, the first biometric data suitable for use in the biometric verification; and providing to the access system an indication of whether the first biometric data matches second biometric data, the second biometric data being biometric data obtained by the user device from the user, so that the access system can use the indication to determine whether to permit the user to access the account via the application.

The method may comprise: using at least part of the reference data to authenticate the first biometric data, wherein said providing is performed in response to successful authentication of the first biometric data.

According to a third aspect of the invention, there is provided a method for a user of a user device to access, via an application executed by the user device, an account for one or more services provided by a service provider, wherein said access is controlled based on biometric verification of the user performed, at least in part, at the user device, wherein the method comprises: providing an identifier associated with the user to an access system used by the service provider; receiving, from the access system, reference data associated at the access system with the identifier; obtaining, from a storage device, first biometric data stored on the storage device, the first biometric data suitable for use in the biometric verification; using at least part of the reference data to authenticate the first biometric data; and in response to successful authentication of the first biometric data, providing to the access system an indication of whether the first biometric data matches second biometric data, the second biometric data being biometric data obtained by the user device from the user, so that the access system can use the indication to determine whether to permit the user to access the account via the application.

For the second and third aspects, the method may further comprising: obtaining, from the storage device, second reference data, wherein the first biometric data is authenticated based on a comparison of the at least part of the reference data received from the access system with the second reference data.

For the second and third aspects, the reference data may comprise one or more of: an address for the storage device; a cryptographic hash of some or all of the biometric data stored on the storage device; a digital signature of some or all of the biometric data stored on the storage device; a public key. Said authentication of the first biometric data may comprises determining whether the cryptographic hash or the digital signature corresponds to some or all of the first biometric data. Additionally, or alternatively, the method may comprise performing a challenge-response authentication with the storage device, using the public key, to verify the authenticity of the storage device.

For the second and third aspects, the method may comprise obtaining the second biometric data using a sensor of the user device.

For the second and third aspects, the method may comprise: after providing the indication to the access system, communicating with the access system to configure the user device and/or the application to enable the user to subsequently access the account via the application without requiring use of the storage device.

For any of the above aspects, the biometric data may represent one or more respective characteristics of one or more of: a fingerprint of the user; a voice of the user; a visual appearance of the user.

For any of the above aspects, the storage device comprises a server accessible by the user device via a network.

Alternatively, for any of the above aspects, the storage device may be an apparatus comprising a secured module arranged to communicate with the user device via near field communication. The method may then comprise optically reading data from the apparatus and deriving one or more keys based on the data optically read from the apparatus, wherein the near field communication is secured using the one or more keys. The apparatus may be one of: an electronic passport; an electronic identification device; an electronic licence.

For any of the above aspects, the method may be performed by executing software on a processor of the user device. The software may form at least a part of the application. The software may use one or more of: software obfuscation; data protection techniques; and control flow protection techniques. The processor of the user device that executes the software may be a secured hardware processor.

For any of the above aspects, the application may be locked to the user device.

For any of the above aspects, the one or more services may comprise one or more of: storage of data for the user and provision of access to said data; provision of electronic communication; provision of access to content; provision of a financial service; social networking.

For any of the above aspects, the user device may be a mobile telephone.

According to a fourth aspect of the invention, there is provided a method for managing access by a user of a user device to an account for one or more services provided by a service provider, said access being via an application executed by the user device, said access controlled based on biometric verification of the user performed, at least in part, at the user device, wherein the method comprises: receiving reference data, the reference data suitable for use in one or both of: (a) access of first biometric data from a storage device and (b) authentication of first biometric data stored on a storage device; associating the reference data with an identifier associated with the user; in response to receiving a request for the reference data based on the identifier, providing the reference data associated with the identifier to the user device; receiving, from the user device, an indication of whether the first biometric data matches second biometric data, the second biometric data being biometric data obtained by the user device from the user; determining, based on the indication, whether to permit the user to access the account via the application.

The reference data may comprise one or more of: an address for the storage device; a cryptographic hash of some or all of the biometric data stored on the storage device; a digital signature of some or all of the biometric data stored on the storage device; a public key.

In some embodiments, said determining comprises denying the user access to the account if the first biometric data does not match the second biometric data.

In some embodiments, said determining comprises allowing the user access to the account if the first biometric data matches the second biometric data. If the user is allowed to access the account, the method may comprise communicating with the user device to configure the user device and/or the application to enable the user to subsequently access the account via the application without requiring use of the storage device.

According to a fifth aspect of the invention, there is provided an apparatus arranged to carry out a method according to any one of the above first to fourth aspects of the invention.

According to a sixth aspect of the invention, there is provided a computer program which, when executed by one or more processors, causes the one or more processors to carry out a method according to any one of the above first to fourth aspects of the invention. The computer program may be stored on a computer-readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 2:
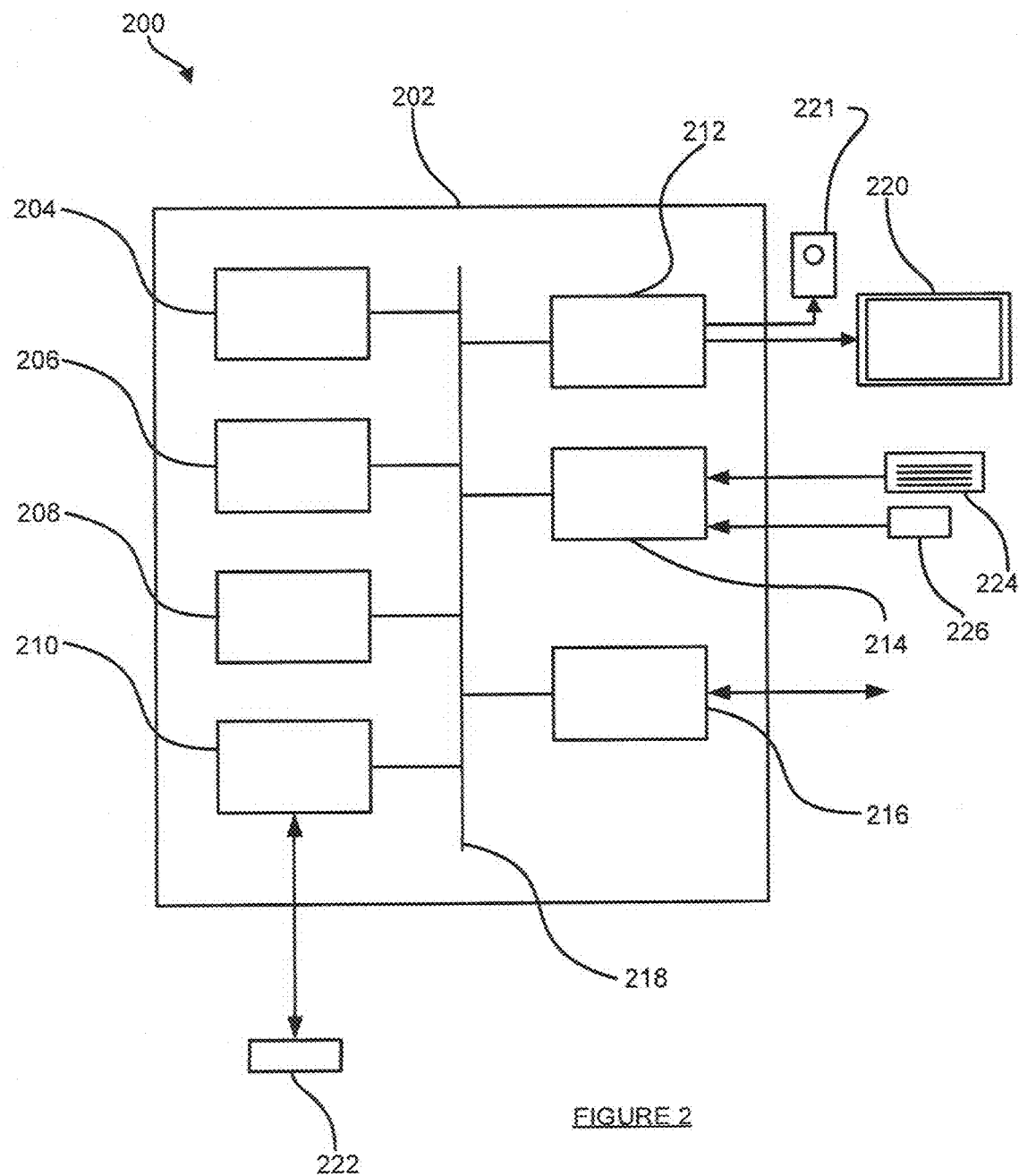
FIG. 2 schematically illustrates an example of a computer system.

FIG. 2 schematically illustrates an example of a computer system 200. The system 200 comprises a computer 202. The computer 202 comprises: a storage medium 204, a memory 206, a processor 208, an interface 210, a user output interface 212, a user input interface 214 and a network interface 216, which are all linked together over one or more communication buses 218.

The storage medium 204 may be any form of non-volatile data storage device such as one or more of a hard disk drive, a magnetic disc, an optical disc, a ROM, etc. The storage medium 204 may store an operating system for the processor 208 to execute in order for the computer 202 to function. The storage medium 204 may also store one or more computer programs (or software or instructions or code).

The memory 206 may be any random access memory (storage unit or volatile storage medium) suitable for storing data and/or computer programs (or software or instructions or code).

The processor 208 may be any data processing unit suitable for executing one or more computer programs (such as those stored on the storage medium 204 and/or in the memory 206), some of which may be computer programs according to embodiments of the invention or computer programs that, when executed by the processor 208, cause the processor 208 to carry out a method according to an embodiment of the invention and configure the system 200 to be a system according to an embodiment of the invention. The processor 208 may comprise a single data processing unit or multiple data processing units operating in parallel, separately or in cooperation with each other. The processor 208, in carrying out data processing operations for embodiments of the invention, may store data to and/or read data from the storage medium 204 and/or the memory 206.

The interface 210 may be any unit for providing an interface to a device 122 external to, or removable from, the computer 202. The device 122 may be a data storage device, for example, one or more of an optical disc, a magnetic disc, a solid-state-storage device, etc. The device 122 may have processing capabilities—for example, the device may be a smart card. The interface 210 may therefore access data from, or provide data to, or interface with, the device 122 in accordance with one or more commands that it receives from the processor 208.

The user input interface 214 is arranged to receive input from a user, or operator, of the system 200. The user may provide this input via one or more input devices of the system 200, such as a mouse (or other pointing device) 126 and/or a keyboard 124, that are connected to, or in communication with, the user input interface 214. However, it will be appreciated that the user may provide input to the computer 202 via one or more additional or alternative input devices (such as a touch screen, a microphone for providing voice/audio input, a camera for providing image/video input). The computer 202 may store the input received from the input devices via the user input interface 214 in the memory 206 for the processor 208 to subsequently access and process, or may pass it straight to the processor 208, so that the processor 208 can respond to the user input accordingly.

The user output interface 212 is arranged to provide a graphical/visual and/or audio output to a user, or operator, of the system 200. As such, the processor 208 may be arranged to instruct the user output interface 212 to form an image/video signal representing a desired graphical output, and to provide this signal to a monitor (or screen or display unit) 120 of the system 200 that is connected to the user output interface 212. Additionally or alternatively, the processor 208 may be arranged to instruct the user output interface 212 to form an audio signal representing a desired audio output, and to provide this signal to one or more speakers 121 of the system 200 that is connected to the user output interface 212.

Finally, the network interface 216 provides functionality for the computer 202 to download data from and/or upload data to one or more data communication networks.

It will be appreciated that the architecture of the system 200 illustrated in FIG. 2 and described above is merely exemplary and that other computer systems 200 with different architectures (for example with fewer components than shown in FIG. 2 or with additional and/or alternative components than shown in FIG. 2) may be used in embodiments of the invention. As examples, the computer system 200 could comprise one or more of: a personal computer; a server computer; a mobile telephone; a tablet; a laptop; a television set; a set top box; a games console; other mobile devices or consumer electronics devices; etc.

2—System Architecture and Use

Figure 3:
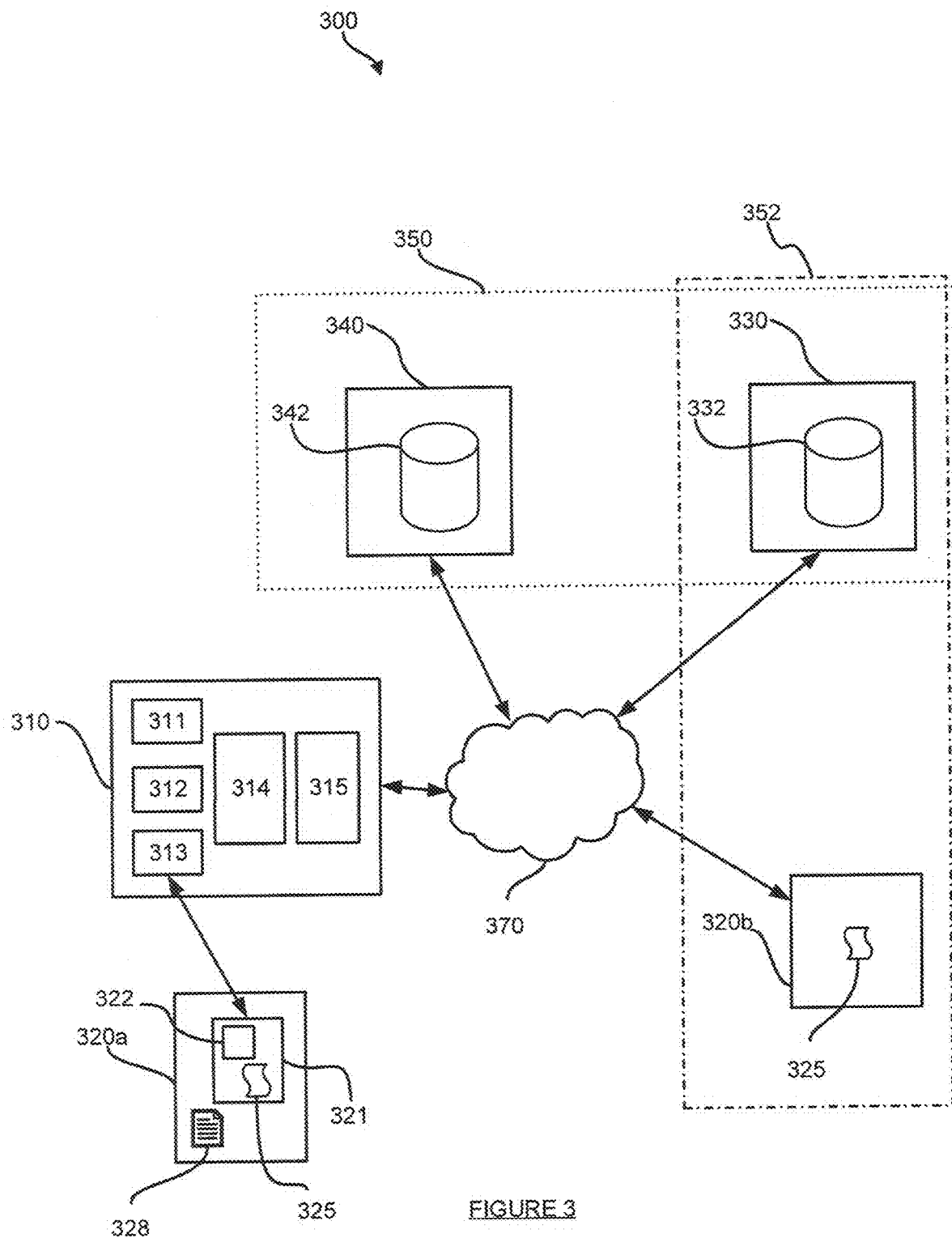
FIG. 3 schematically illustrates an example system according to some embodiments of the invention.

FIG. 3 schematically illustrates an example system 300 according to some embodiments of the invention. The system 300 comprises a user device 310, a storage device 320 (with two examples, namely storages devices 320a and 320b, being shown in FIG. 3), an access system 330, a service provider system 340 and a network 370.

The user device 310, the storage device 320b, the access system 330 and the service provider system 340 may be arranged to communicate with one or more of each other over, or via, the network 370. The network 370 may be any kind of network suitable for transmitting or communicating data from any one of the user device 310, the storage device 320b, the access system 330 and the service provider system 340 to another one of the user device 310, the storage device 320b, the access system 330 and the service provider system 340. For example, the network 370 could comprise one or more of a local area network, a wide area network, a metropolitan area network, the internet, a wireless communications network, a cable network, a digital broadcast network, a satellite communication network, a telephone network, etc. The user device 310, the storage device 320b, the access system 330 and the service provider system 340 may communicate over the network 370 via any suitable communication mechanism/protocol in order to communicate data with each other. However, it will be appreciated that other communication scenarios are possible.

Whilst FIG. 3 illustrates a single user device 310, a single storage device 320b, a single access system 330 and a single service provider system 340, it will be appreciated that there may be multiple user devices 310, multiple storage devices 320b, multiple access systems 330 and multiple service provider systems 340 and that FIG. 3 has been simplified for ease of illustration.

The user device 310, the storage device 320b, the access system 330 and the service provider system 340 may each be, or may each comprise, one or more computer systems 200 as described above with reference to FIG. 2. For example, the user device 310 may be a personal computer, a server computer, a laptop, a mobile telephone, a tablet computer, a television, etc. Similarly, the storage device 320b, the access system 330 and the service provider system 340 may, for example, each comprise one or more server computers.

The user device 310 may comprise one or more sensors 311 for obtaining biometric information/data from (or about) a user. For example, the one or more sensors 311 may comprise one or more of: a fingerprint reader; a microphone for capturing data representing audio (e.g. a voice) from the user; a camera for capturing one or more images of the user (e.g. of a face or an iris of the user). Thus, the user device may obtain biometric data—herein, the term "biometric data" is data that represents one or more respective characteristics of the user or that can be used to identify the user, such as one or more of: a fingerprint of the user; a voice of the user; a visual appearance of the user; etc.

The user device 310 may comprise a camera 312 (which may be the same as, or different from, the one or more sensors 311).

The user device 310 may comprise a wireless communications device 313 (such as an NFC device).

The user device 310 comprises a processor 314 for executing one or more applications or software. The user device 310 may also comprise a secured processing device (or module) 315 for executing one or more applications or software and/or for storing data on the user device 310 in a secured manner. The processor 314 and the secured processing device 315 may operate together to jointly execute one or more applications or software, whereby operations that need to be (or should preferably be) carried out in a secured manner and/or operations that operate on data that needs to (or should preferably) remain secured are carried out by the secured processing device 315, whilst other operations may be carried out by the processor 314. However, it will be appreciated that the user device 310 does not necessarily need to use a secured processing device 315 and that, instead, one or more applications and/or software may be implemented in a protected form (e.g. using one or more of: software obfuscation; data protection techniques; and control flow protection techniques) so that at least part of the operations of and/or data processed by and/or data stored by the one or more applications and/or software may be secured against attacks by attackers. Such protection techniques are well-known. Moreover, one or more applications and/or software executed by the processor 314 and/or the secured processing device 315 may be locked to the user device 310 (so that that particular instance of the one or more applications and/or software would not execute in the normal/desired manner on a different user device). Some embodiments of the invention may be implemented by software executed on the user device 310—the above comments related to software protection and execution (at least in part) on the secured processing device 315 apply to such software.

Some embodiments make use of the storage device 320*a* instead of the storage device 320*b*. Some embodiments make use of the storage device 320*b* instead of the storage device 320*a*. Some embodiments make use of both the storage device 320*a* and the storage device 320*b*.

The storage device 320*a* comprises a secured electronic device 321 that (a) has a wireless communications device 322 (such as an NFC device) suitable for communicating with the wireless communications device 313 of the user device 310 and that (b) stores biometric data 325. The storage device 320*a* may have data 328 printed thereon which is optically readable (for example optically readable by the user device 310 via the camera 312). Thus, the storage device 320*a* may be, for example, one of the above-mentioned electronic identification (e.g. an electronic passport, electronic identification card, electronic licence, etc.), so that the user device 310 can access/obtain the biometric data 325 from the storage device 320*a* as discussed above. In normal operation, the storage device 320*a* belongs to the user of the user device 310 (so that the biometric data 325 relates to the user of the user device 310).

The storage device 320*b* may be, or may comprise, one or more servers, remote from the user device 310. The storage device 320*b* may store biometric data 325 related to the user of the user device 310 and may provide the biometric data 325 to the user device 310 upon request. This may require additional authentication of the user and/or the user device 310 (e.g. provision of a password or passphrase, etc.) to ensure that only an authorized user or user device 310 can obtain the biometric data 325 from the storage device 320*b*.

The service provider system 340 may be, or may comprise, one or more servers. The service provider system 340 provides one or more services to users or customers. The service provider system 340 may, therefore, be a cloud-based service provider. Examples of the services provided by some embodiments include one or more of: storage of data for a user and provision of access to that data (e.g. data storage in the cloud); provision of electronic communication (e.g. emails, instant messages, etc.); provision of access to content (e.g. downloading or purchasing of music, images, video, etc.); provision of a financial service (e.g. banking services); social networking. Thus a user (such as the user of the user device 310) may have one or more accounts with the service provider system 340, where each account relates to, or is for, one or more of the service(s) provided by the service provider system 340. The service provider system 340 may therefore be seen as an issuer of an account for the user.

The service provider system 340 may, comprise one or more databases or storage 342 for storing data relating to the account of a user and/or for storing data for a user (e.g. emails, images, etc.) relating to one or more of the services provided by that service provider system 340.

The access system 330 may be, or may comprise, one or more servers. The access system 330 may comprise a database 332. As shall be discussed in more detail later, the access system 330 may associate reference data with an identifier associated with the user. The nature of the "reference data" shall be described later. The identifier associated with the user may be any information relating to the user, such as an email address or an account number. The access system 330 may store this association in the database 332.

The service provider system 340 may be operated and run by an entity different from the entity operating and running the access system 330. However, in some embodiments, the service provider system 340 may be operated and run by the same entity as the entity operating and running the access system 330. In that case, the service provider system 340 and the access system 330 may form part of a single system (illustrated in FIG. 3 by a dotted line 350).

Additionally or alternatively, the storage device 320*b* is preferably operated and run by an entity different from the entity (or entities) operating and running the access system 330 and the service provider system 340, so that the access system 330 and the service provider system 340 do not have access to the biometric data 325. However, this may not always be possible. Thus, for example, in some embodiments, the storage device 320*b* may be operated and run by the same entity as the entity operating and running the access system 330—in that case, the storage device 320*b* and the access system 330 may form part of a single system (illustrated in FIG. 3 by a dot-dashed line 352).

As discussed above, it is known to be able to execute an application on the user device 310 in order to access an account for one or more services provided by the service provider 340, wherein that access is controlled based on biometric verification of the user performed, at least in part, at the user device 310. The user may (additionally) be able to access the user account via other mechanisms (e.g. the usual provision of a username and password). Embodiments of the invention, however, relate to situation in which the user wishes to be able to access an account for one or more services provided by the service provider 340 using an application executed on their user device 310, wherein that access is controlled based on biometric verification of the user performed, at least in part, at the user device 310. However, part of the problem then faced is that, if the user loses their user device 310, then the user may no longer be able to access the account (since the biometric verification that would normally be performed in order to gain access may rely on parameters or other data stored securely on the user device 310). Similarly, if the user device 310 is re-initialized (e.g. back to factory settings), or if the user wishes to start using a different device, then the user may not be able to use the re-initialized device or the new device to access the account. Thus, some embodiments of the invention help address the issue of how recover, or provide, access to that account.

In summary, embodiments of the invention provide for an enrolment/registration process, and for a subsequent account recovery process.

The enrolment process involves, at the mobile device 310, carrying out a method for facilitating a user to subsequently access, via an application executed by the user device 310 of the user, an account for one or more services provided by the service provider system 340, wherein said access is controlled based on biometric verification of the user performed, at least in part, at the user device 310, wherein the method comprises:

Obtaining reference data from a storage device (such as the storage device 320a or 320b). As discussed above, the storage device 320 stores biometric data 325 for the user suitable for use in the biometric verification of the user. The reference data is suitable for use in one or both of: (a) subsequent access of the biometric data 325 from the storage device 320 and (b) authentication of the biometric data 325.

Providing the reference data to the access system 330 used by the service provider system 340 so that the access system 330 can associate the reference data with an identifier associated with the user. The identifier could be, for example, a user name for the user, or account identifier/name for the account, etc.

More detail on the enrolment process shall be set out later.

The account recovery process may involve, at the mobile device 310, carrying out a method for a user of the user device 310 to access, via an application executed by the user device 310, an account for one or more services provided by the service provider system 340, wherein said access is controlled based on biometric verification of the user performed, at least in part, at the user device 310, wherein the method comprises:

Providing an identifier associated with the user to the access system 330 used by the service provider system 340. As above, the identifier could be, for example, a user name for the user, or account identifier/name for the account, etc.

Receiving, from the access system 330, reference data associated at the access system 330 with the identifier.

Using at least part of the reference data to obtain, from a storage device (such as the storage device 320a or 320b), first biometric data 325 stored on the storage device 320. As discussed above, the first biometric data 325 is suitable for use in the biometric verification. For example, the reference data could comprise an address for the storage device 320 (e.g. a URL for the storage device 320b), so that the user device 310 can use this address to locate and retrieve the biometric data 325.

Providing to the access system an indication of whether the first biometric data 325 matches second biometric data, the second biometric data being biometric data obtained by the user device 310 from the user, so that the access system 330 can use the indication to determine whether to permit the user to access the account via the application.

This may also involve using at least part of the reference data to authenticate the first biometric data 325, in which case the user device 310 provides the indication to the access system 330 in response to successful authentication of the first biometric data 325.

Alternatively, the account recovery process may involve, at the mobile device 310, carrying out a method for a user of a user device to access, via an application executed by the user device 310, an account for one or more services provided by the service provider system 340, wherein said access is controlled based on biometric verification of the user performed, at least in part, at the user device 310, wherein the method comprises:

Providing an identifier associated with the user to the access system 330 used by the service provider system 340. As above, the identifier could be, for example, a user name for the user, or account identifier/name for the account, etc.

Receiving, from the access system 330, reference data associated at the access system 330 with the identifier.

Obtaining, from a storage device (such as the storage device 320a or 320b), first biometric data 325 stored on the storage device 320, the first biometric data 325 suitable for use in the biometric verification;

Using at least part of the reference data to authenticate the first biometric data 325.

In response to successful authentication of the first biometric data 325, providing to the access system 330 an indication of whether the first biometric data 325 matches second biometric data, the second biometric data being biometric data obtained by the user device 310 from the user, so that the access system can use the indication to determine whether to permit the user to access the account via the application.

More detail on the account recovery process shall be set out later.

Complementary operations are performed by the access system 330. Thus, in some embodiments, the access system 330 may carry out a method for managing access by a user of the user device 310 to an account for one or more services provided by the service provider system 340, said access being via an application executed by the user device 310, said access controlled based on biometric verification of the user performed, at least in part, at the user device 310, wherein the method comprises:

Receiving reference data, the reference data suitable for use in one or both of: (a) access of first biometric data 325 from a storage device (such as the storage device 320a or 320b) and (b) authentication of first biometric data 325 stored on a storage device (such as the storage device 320a or 320b).

Associating (e.g. in the database 332) the reference data with an identifier associated with the user. As above, the identifier could be, for example, a user name for the user, or account identifier/name for the account, etc.

In response to receiving a request for the reference data based on the identifier, providing the reference data associated with the identifier to the user device 310.

Receiving, from the user device 310, an indication of whether the first biometric data matches second biometric data, the second biometric data being biometric data obtained by the user device 310 from the user.

Determining, based on the indication, whether to permit the user to access the account via the application.

The reference data may, for example, comprises one or more of: (i) an address for the storage device 320 (e.g. a URL for the storage device 320*b*); (ii) a cryptographic hash of some or all of the biometric data 325 stored on the storage device 320; (iii) a digital signature of some or all of the biometric data 325 stored on the storage device 320; and (iv) a public key.

In some embodiments, sensor devices 311 on the user device 310 are used to obtain a data sample with biometric properties from the user. As mentioned above, this can be a fingerprint sensor, a camera to record a face, a microphone to record a voice and so on. These inputs generally first are used in a learning process for estimates a set of parameters that facilitate the fast and reliable detection of an authenticating input. Alternatively, this may not be required—e.g. in the case of recovering an account where the password has been hacked, in which case embodiments of the invention enable account recovery where the user's ID and password have been stolen.

The parameters used in the user detection module are sensitive user data, so they need to be protected. An option is to store the biometric parameters in a secured processor module 315 of the device 310. The hardware tamper resistance measures protect the biometric data against unauthorized access. This enhances the privacy of the user as the biometric parameters are not available outside the secured processor module 315. The user detection module usually also is implemented in the secured processor module 315 as this provides a further protection of the biometric data. After authenticating the user, the secured processor may establish a secured and authenticated connection with a remote server (e.g. the service provider system 340) e.g. for accessing personal data of the user of the device 310. The user needs to first set-up an account with the service provider in order to store personal data. As part of the account set-up the user may establish an identifier (username) for the account. A commonly used identifier is an email account.

In case the device 310 no longer is available for, or capable of, its authentication function (e.g. due to a lost device), the service provider system 340 needs to enable the user to restore access to the service for the account of the user. Embodiments of the invention enable account recovery, whilst also enables the user to minimize the distribution of personal information.

Access Recovery Enrolment (the Enrolment Process)

In some embodiments, the user can use an electronic identification (such as the storage device 320*a*) as a means to identify themselves to the service provider system 340 via the device 310 connected to the network 370. Once the identification has been successfully completed the user may simply access their account, or may change settings on their account which may include changing a password, associating a device with their account, associating a biometric reader with their account etc.

Figure 1:
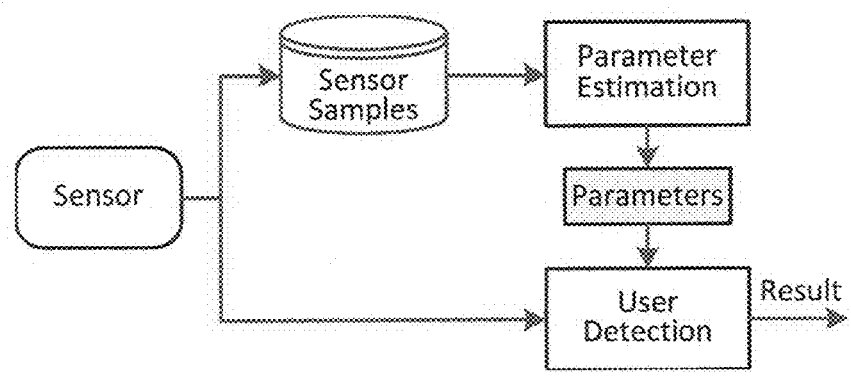
FIG. 1 schematically illustrates use of a biometric sensor for biometric authentication.
Figure 4:
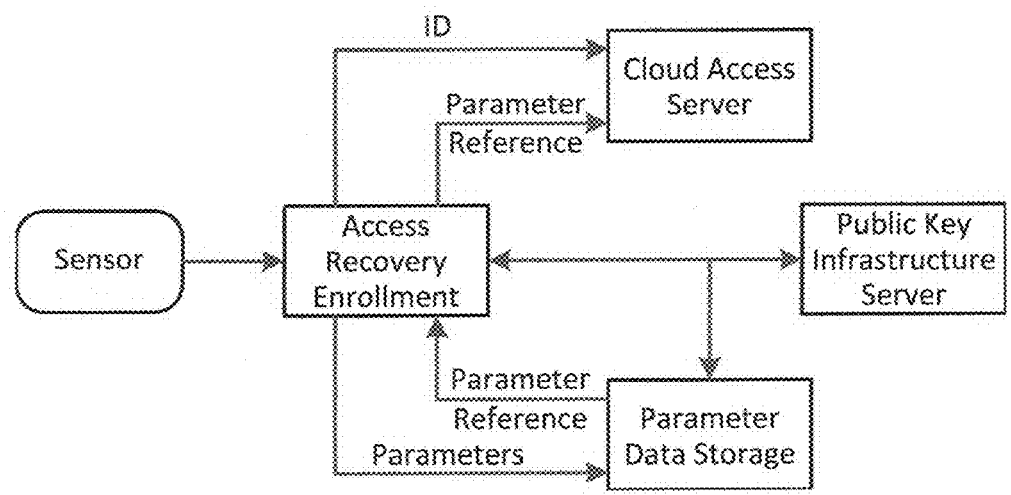
FIG. 4 schematically illustrates an access recovery enrolment method according to an embodiment of the invention.

The user may activate a recovery option on his account via the access system 330. FIG. 4 schematically illustrates an access recovery enrolment method according to an embodiment of the invention.

FIG. 4 shows an Access Recovery Enrolment module that associates a Parameter Reference (or reference data) with an Identifier (ID) for an account handled by the Cloud Access server (the access system 330) of the Cloud Service Provider (the service provider system 340). The Parameter Reference enables a future retrieval of a set of parameters for authenticating a user for the Cloud Access server account. Preferably, the Cloud Access server itself does not store the parameters, meaning that the use of the Parameter Reference enhances the privacy of the user. The Parameter Reference may consist of a storage location (or storage device) address and/or an authenticated hash of the parameters. This enables the later verification of the authenticity of the retrieved parameters. The storage location can be a remote server or a dedicated storage medium issued by an independent User Identification service (e.g. an electronic passport supplied by a passport issuing entity). In both cases, preferably the stored Parameters can only be accessed by authorized parties. Accessing the parameters may involve a further biometric identification process, a username password combination or similar methods to authenticate a user.

FIG. 4 also shows an optional sensor that is used in a learning process to estimate the parameters used in the user detection process. These parameters may be stored in a Parameter Data Storage and a Parameter Reference is associated with these parameters so they can be retrieved in future. The Parameter Reference may be authenticated using a PKI infrastructure.

Access Recovery Validation (the Account Recover Process)

Figure 5:
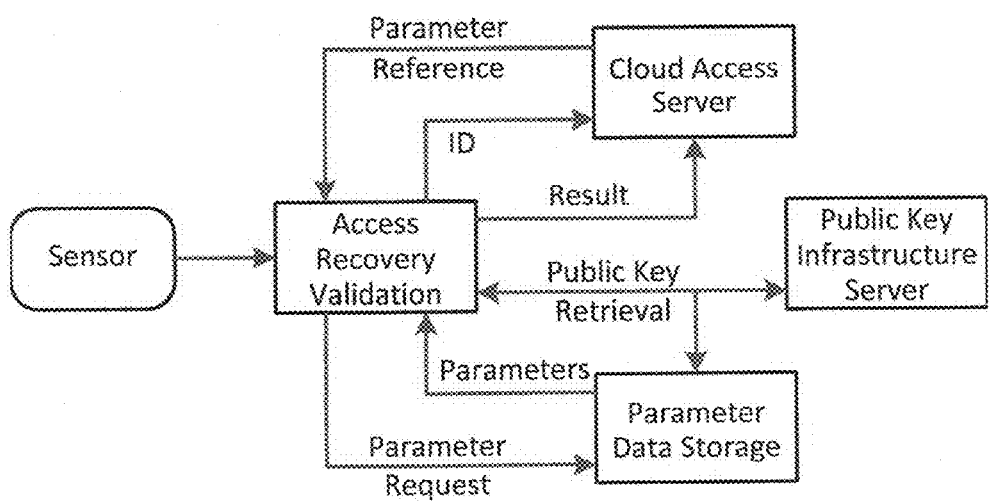
FIG. 5 schematically illustrates an access recovery validation process according to an embodiment of the invention.

The main objective of the above access recovery enrolment is activating the ability to recover access to an account in the future e.g. after losing a device 310 (mobile phone) configured for validating a user to a cloud service (the service provider system 340). FIG. 5 schematically illustrates an access recovery validation process according to an embodiment of the invention.

The Access Recovery Validation module first retrieves a Parameter Reference that the Cloud Access Server has associated with a particular account identifier (e.g. a username). The Parameter Reference may enable the Access Recovery Validation module to locate the Parameter Data Storage (e.g. if the storage is the storage device 320*b* remote from the device 310) and retrieve the parameters for validating a user. If the Parameter Reference contains an authenticated hash of the parameters, the Access Recovery Module can verify the correctness and authenticity of the retrieved parameters. The Access Recovery Module next uses a sensor of the device (mobile phone) to collect a sample data input representing the user. It then uses the parameters to process the sample data input and submits the results to the Cloud Access Server. The result might be a binary matching result, a percentage rating for the user match or some other value that the Cloud Access Server can use to restore access to the account for the particular device (mobile phone).

3a—Example: Electronic Passport

An example related to electronic passports is given below. It will be appreciated that similar techniques can be used for other forms of electronic identification.

For enrolment, the Access Recovery Enrolment module scans the passport the user wants to use for later recovery. The module first captures the passport's main page using the camera and then extracts the data stored electronically in the passport using a secured NFC connection. The key for the secured NFC connection is derived from the information in the main page of the passport. Therefore, some processing of the image of the passport is required to gain access to the electronic information in the passport.

Figure 6:
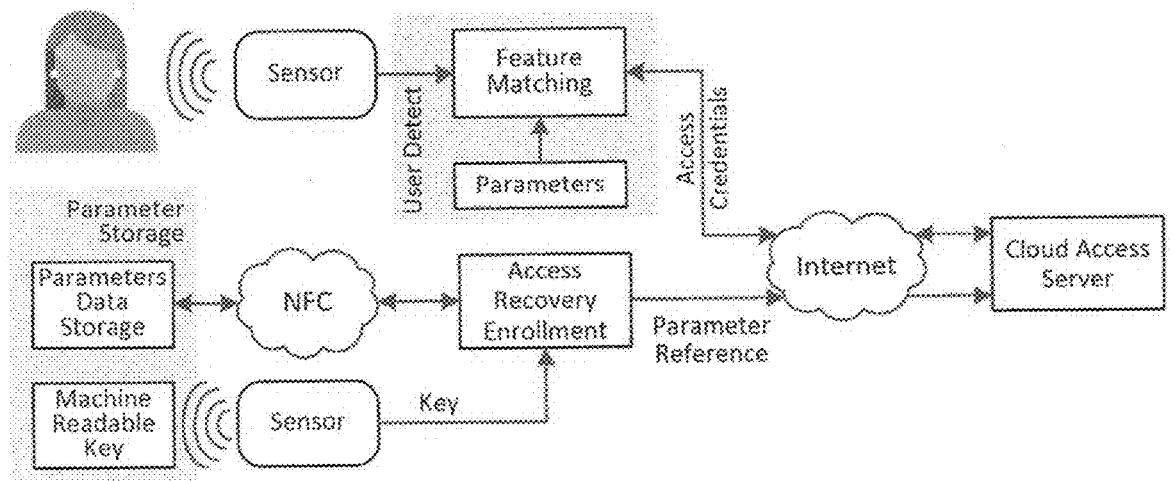
FIG. 6 schematically illustrates an access recovery enrolment method according to an embodiment of the invention.

The Access Recovery Enrolment application may retrieve the lower public key, hashes and signatures for these fields using the NFC connection and then send this information encoded as a Parameter Reference to the server. This is illustrated the FIG. 6.

The application on the device 310 or on the server 330 may issue a challenge to the passport by encrypting a number with the public key that can be read out from the passport. The passport proves itself by returning the decrypted number to the application or the server. This proves that the actual passport is present and that an attacker has not previously read data from the passport and is in effect cloning the passport. It will be appreciated that other challenge-response mechanisms could be used to confirm that the actual passport is present.

Using the signed information as a Parameter Reference gets around the problem that the higher public keys are distributed securely by the national authorities and these are not accessible for commercial applications. This makes it difficult for an attacker to clone or replace an NFC chip and the data it contains Some electronic passports contain an NFC chip with anti-cloning functionality. The Access Recovery Enrolment module may use this functionality to establish a second factor of authentication. https://en.wikipedia.org/wiki/Biometric_passport describes how the public key used for the signature is in the passport and is signed by the countries secret key (i.e. the country's public key is not in the passport and is only available to other countries who sign up to the system).

Figure 7:
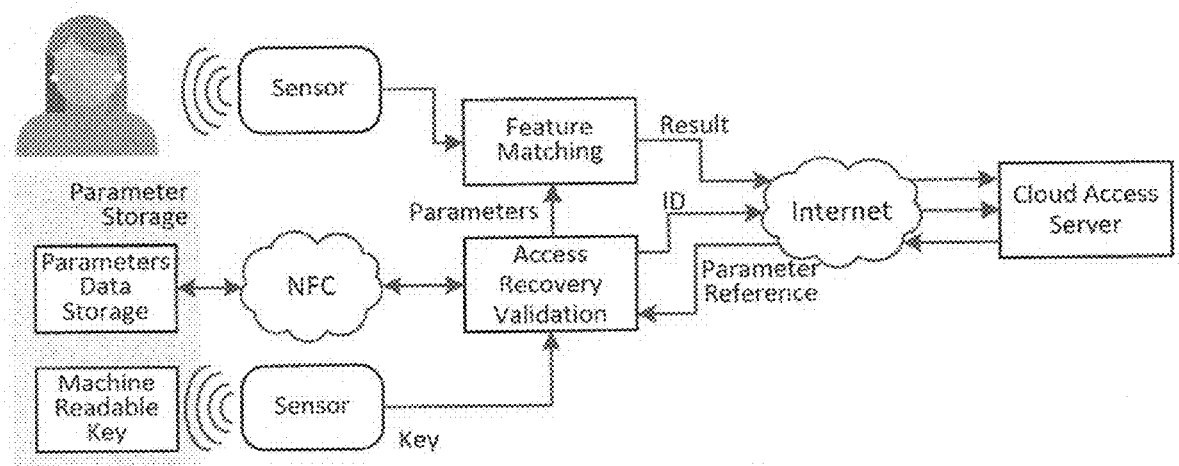
FIG. 7 schematically illustrates an access recovery validation process according to an embodiment of the invention.

When the user loses their device (mobile phone), or the device is no longer available or capable of performing the biometric authentication, it no longer is possible to gain access to the Cloud Access server 330. After replacing the device, the user activates an Access Recovery Validation process after requesting the Cloud Access Server to restore access for a particular user ID (a username, an email address, an account number etc.). The Cloud Access Server may supply an Access Recovery Validation module for the replacement device (a downloaded software application or a pre-installed firmware module)—alternatively, this module may already be part of the application executing on the device 310 via which the user wishes to access the account. The Cloud Access Server supplies a Parameter Reference associated with the user ID. FIG. 7 schematically illustrates the access recovery process according to an embodiment of the invention.

The Access Recovery Validation module interacts with the main page of passport to obtain the key to gain access to the NFC device embedded in the passport. The Access Recovery Validation module then retrieves the biometric detection parameters from the relevant data fields in the electronic passport using a secured NFC communication link. The Access Recovery Validation module checks that the same hashes and signatures are used and that signatures are valid for the retrieved parameters. As the system relies on the data during enrolment matching the data retrieved at a later moment, there is no need to be signed up to the national exchange of the PKI system.

The application on the device 310 or on the server 330 may issue a challenge to the passport by encrypting a number with the public key that can be read out from the passport. The passport proves itself by returning the decrypted number to the application or the server. This proves that the actual passport is present and that an attacker has not previously read data from the passport and is in effect cloning the passport. It will be appreciated that other challenge-response mechanisms could be used to confirm that the actual passport is present.

After validating that the appropriate passport is present, the Access Recovery Validation module then uses a sensor and the retrieved biometric parameters to validate that the person holding the device (mobile phone) is valid. The validation step matches a recorded identification pattern (photo, retina scan, or fingerprint) and uses one of the sensors in the device to determine a match with the user of the device. This validation preferably uses techniques that prevent the usage of a still image or a video recording as a proxy for the person. The result is returned to the Cloud Access Server and the result forms the basis for its access restore decision.

If the passport is lost, the enrolment needs to be performed again. Depending on the information stored in the Cloud Access server it might be possible to reuse some of this with a new passport. For example if a common key is used to sign all data fields, it might be possible to upload less sensitive data fields to the server with the signature and public key. In recovery mode, the Cloud Access server sends the data that has been signed back to the Access Recovery Validation module. The module validates that the data is the same in the new passport and that the signature using the public key in the passport gives a valid response. It can then check the image file passes the signature check with the same public key.

If the passport has expired but still is in possession of the user, it can still be used by the Access Recovery Validation module as the main page and the NFC storage device are still operational after expiry of the passport.

After returning a result to the Cloud Access Server, the device 310 and the server 330 may need to exchange parameters to re-establish access to the Cloud Access Server using a valid input to a biometric sensor. These steps are comparable to the steps of the account creation. It should be appreciated that the processing of the result may be implemented in the device (mobile phone) instead of the server. In that case, the result is processed in the device preferably using a secured processing module.

3b—Other Examples

In a variant, the electronic passport functionality is replaced by a portable biometric data storage module. This may hold a set of biometric parameters that can be used to verify the user. The storage module needs to contain keys to authenticate and protect the data on the storage device. The key management may be implemented by a third party who also may play a role in the Access Recovery procedure. As this may be a private entity, access to keys can follow a different procedure compared to a PKI infrastructure for electronic passports.

In yet another variant the portable biometric data can be obtained from another device (mobile phone) that the user has associated with the account (for enabling access to the same data from different devices). As the user can use the still registered device to access the account, the user may simple de-activate access for the lost device and add the new device.

In some countries passports are not commonly available to users. This means that for some users, an electronic passport is not possible. The portable biometric data storage module 320a partly solves this problem but may still require a third party to set up and manage an infrastructure of trusted portable data storage modules for this purpose. Embodiments of the invention may solve this by storing the parameters 325 in a cloud server of an account recovery service (e.g. server 330). The account recovery service may be set-up and operated independently from cloud server providers 340. The user first needs to sign up to the access recovery service and may use the fingerprint sensor for authenticating access to the access recovery service. Instead of storing the biometric data in a passport, the user stores the biometric parameters with the access recovery service. The access recovery service may use cryptographic means to protect and authenticate the data. The access recovery server the associates a reference value with the stored parameters that can be supplied to an access recovery enrolment process of a cloud service.

4—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for a user of a user device to access, via an application executed by the user device of the user, an account for one or more services provided by a remote service provider computing system over a distributed computing network, wherein said access is controlled based on biometric verification of the user performed, at least in part, at the user device, wherein the method comprises:
  by the user device, providing an identifier associated with the user to an access system used by the service provider;
  by the user device, receiving, from the access system, reference data associated at the access system with the identifier;
  by the user device, obtaining, from a storage device, first biometric data stored on the storage device, the first biometric data suitable for use in the biometric verification, wherein the storage device is a device that belongs to the user, is separate from the user device and includes a secure module that is configured to transmit the first biometric data to the user device using a near field communication (NFC) protocol; and
  by the user device, providing to the access system an indication of whether the first biometric data matches second biometric data, the second biometric data being biometric data obtained by the user device from the user, so that the access system can use the indication to determine whether to permit the user to access the account via the application;
  wherein one or both of the following apply:
  (a) said obtaining uses at least part of the reference data; and/or
  (b) the method comprises, by the user device, using at least part of the reference data to authenticate the first biometric data, wherein said providing to the access system an indication of whether the first biometric data matches second biometric data is performed in response to successful authentication of the first biometric data.

2. The method of claim 1, comprising:
  obtaining, from the storage device, second reference data, wherein the first biometric data is authenticated based on a comparison of the at least part of the reference data received from the access system with the second reference data.

3. The method of claim 1, wherein the reference data comprises one or more of:
  an address for the storage device;
  a cryptographic hash of some or all of the biometric data stored on the storage device;
  a digital signature of some or all of the biometric data stored on the storage device;
  a public key.

4. The method of claim 3, wherein one or both of the following apply:
  (a) said authentication of the first biometric data comprises determining whether the cryptographic hash or the digital signature corresponds to some or all of the first biometric data;
  (b) the method comprises performing a challenge-response authentication with the storage device, using the public key, to verify the authenticity of the storage device.

5. The method of claim 1, comprising obtaining the second biometric data using a sensor of the user device.

6. The method of claim 1, comprising:
after providing the indication to the access system, communicating with the access system to configure the user device and/or the application to enable the user to subsequently access the account via the application without requiring use of the storage device.

7. The method of claim 1, wherein the biometric data represents one or more respective characteristics of one or more of: a fingerprint of the user; a voice of the user; a visual appearance of the user.

8. The method of claim 1, wherein:
(a) the method comprises optically reading key data from the storage device and deriving one or more keys based on the key data, wherein the first biometric data transmitted to the user device is secured using the one or more keys.

9. The method of claim 1, wherein at least one of the following applies:
(a) the method is performed by executing software on a processor of the user device;
(b) the method is performed by at least a part of the application;
(c) the method is performed by executing software on a processor of the user device, wherein the software uses one or more of: software obfuscation; data protection techniques; and control flow protection techniques;
(d) the method is performed by executing software on a secured hardware processor of the user device.

10. The method of claim 1, wherein the application is locked to the user device.

11. The method of claim 1, wherein the one or more services comprise one or more of:
storage of data for the user and provision of access to said data;
provision of electronic communication;
provision of access to content;
provision of a financial service;
social networking.

12. The method of claim 1, wherein the user device is a mobile telephone.

13. A user device comprising one or more processors, the one or more processors arranged to enable the user device of a user to access, via an application executed by the one or more processors, an account for one or more services provided by a remote service provider computing system over a distributed computing network, wherein said access is controlled based on biometric verification of the user performed, at least in part, at the user device, wherein accessing the account comprises:
by the user device, providing an identifier associated with the user to an access system used by the service provider;
by the user device, receiving, from the access system, reference data associated at the access system with the identifier;
by the user device, obtaining, from a storage device, first biometric data stored on the storage device, the first biometric data suitable for use in the biometric verification, wherein the storage device is a device that belongs to the user, is separate from the user device and includes a secure module that is configured to transmit the first biometric data to the user device using a near field communication (NFC) protocol; and
by the user device, providing to the access system an indication of whether the first biometric data matches second biometric data, the second biometric data being biometric data obtained by the user device from the user, so that the access system can use the indication to determine whether to permit the user to access the account via the application;
wherein one or both of the following apply:
(a) said obtaining uses at least part of the reference data; and/or
(b) accessing the account further comprises, by the user device, using at least part of the reference data to authenticate the first biometric data, wherein said providing to the access system an indication of whether the first biometric data matches second biometric data is performed in response to successful authentication of the first biometric data.

14. A system comprising one or more processors, the one or more processors arranged to manage access by a user of a user device to an account for one or more services provided by a remote service provider computing system over a distributed computing network, said access being via an application executed by the user device of the user, said access controlled based on biometric verification of the user performed, at least in part, at the user device, wherein said managing access comprises:
by an access system of the system, receiving reference data, whereby the reference data can be used by the user device to at least one of: (a) access of first biometric data from a storage device and (b) authenticate first biometric data stored on a storage device;
by the access system, associating the reference data with an identifier associated with the user;
by the access system, in response to receiving a request for the reference data based on the identifier, providing the reference data associated with the identifier to the user device;
by the access system, receiving, from the user device, an indication of whether the first biometric data received from the storage device matches second biometric data, the second biometric data being biometric data obtained by the user device from the user;
by the access system, determining, based on the indication, whether to permit the user to access the account via the application, and
wherein the storage device is a device that belongs to the user, is separate from the user device and includes a secure module that is configured to transmit the first biometric data to the user device using a near field communication (NFC) protocol.

15. The method of claim 8, wherein the storage device is one of an electronic passport, an electronic identification device, and an electronic license.

16. The user device of claim 13, wherein the storage device is one of an electronic passport, an electronic identification device, and an electronic license.

17. The system of claim 14, wherein the storage device is one of an electronic passport, an electronic identification device, and an electronic license.

* * * * *